US010609372B2

(12) United States Patent
Su et al.

(10) Patent No.: US 10,609,372 B2
(45) Date of Patent: Mar. 31, 2020

(54) UP-CONVERSION TO CONTENT ADAPTIVE PERCEPTUAL QUANTIZATION VIDEO SIGNALS

(71) Applicant: DOLBY LABORATORIES LICENSING CORPORATION, San Francisco, CA (US)

(72) Inventors: Guan-Ming Su, Fremont, CA (US); Amin Kheradmand, Mountain View, CA (US); Navaneeth Kamballur Kottayil, Edmonton (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 3 days.

(21) Appl. No.: 16/139,965

(22) Filed: Sep. 24, 2018

(65) Prior Publication Data

US 2019/0104309 A1  Apr. 4, 2019

Related U.S. Application Data

(60) Provisional application No. 62/565,382, filed on Sep. 29, 2017.

(30) Foreign Application Priority Data

Sep. 29, 2017  (EP) .................................. 17194053

(51) Int. Cl.
*H04N 19/176* (2014.01)
*H04N 19/14* (2014.01)
(Continued)

(52) U.S. Cl.
CPC ........... *H04N 19/124* (2014.11); *H04N 19/11* (2014.11); *H04N 19/117* (2014.11); *H04N 19/14* (2014.11);
(Continued)

(58) Field of Classification Search
CPC ............................ H04N 19/124; H04N 19/11
See application file for complete search history.

(56) References Cited

U.S. PATENT DOCUMENTS 8,532,375 B2 * 9/2013 Bhagavathy ........... H04N 1/409
                                                382/165
8,639,057 B1 * 1/2014 Mendhekar ............ H04N 19/86
                                                382/275

(Continued)

FOREIGN PATENT DOCUMENTS

WO  2011/128055  10/2011
WO  2014/204865  12/2014
(Continued)

OTHER PUBLICATIONS

Ploumis, S. et al "Perception-Based Histogram Equalization for Tone Mapping Applications" IEEE Digital Media Industry & Academic Forum, Jul. 4, 2016, pp. 11-16.
(Continued)

*Primary Examiner* — Irfan Habib

(57) ABSTRACT

Input minimal noise levels of are computed over input codeword bins based on image content in input images of an input bit depth. The minimal noise levels are adjusted to generate approximated minimal noise levels of a higher bit depth. The approximated minimal noise levels are used to generate per-bin bit depths over the input codeword bins. The input codeword bins are classified into first codeword bins that have relatively high risks of banding artifacts and some other input codeword bins that have relatively low or zero risks of banding artifacts based on the per-bin bit depths. Portions of bit depths from the other input codeword bins are moved to the first input codeword bins to generate modified per-bin bit depths. A forward reshaping function (Continued)

constructed from the modified per-bin bit depths is used to reshape the input images into reshaped images used to generate output images.

24 Claims, 9 Drawing Sheets

(51) Int. Cl.
*H04N 19/124* (2014.01)
*H04N 19/36* (2014.01)
*H04N 19/37* (2014.01)
*H04N 19/11* (2014.01)
*H04N 19/117* (2014.01)

(52) U.S. Cl.
CPC ........... *H04N 19/176* (2014.11); *H04N 19/36* (2014.11); *H04N 19/37* (2014.11)

(56) References Cited

U.S. PATENT DOCUMENTS

| | | | |
|---|---|---|---|
| 8,811,490 B2* | 8/2014 | Su | H04N 19/30 375/240.16 |
| 8,880,571 B2 | 11/2014 | Srinivasan | |
| 9,098,906 B2* | 8/2015 | Bruls | G06T 9/004 |
| 9,106,888 B2 | 8/2015 | Chou | |
| 9,571,856 B2* | 2/2017 | Sun | H04N 19/149 |
| 9,699,482 B2* | 7/2017 | Mertens | H04N 1/6058 |
| 9,911,179 B2* | 3/2018 | Su | H04N 19/86 |
| 10,032,262 B2 | 7/2018 | Kheradmand | |
| 10,080,026 B2 | 9/2018 | Su | |
| 10,116,938 B2* | 10/2018 | Minoo | H04N 19/124 |
| 10,136,074 B2* | 11/2018 | Tao | H04N 5/265 |
| 10,165,288 B2* | 12/2018 | Yin | H04N 19/80 |
| 10,171,812 B2* | 1/2019 | Toma | H04N 19/46 |
| 10,194,162 B2* | 1/2019 | Van Der Vleuten | H04N 5/2355 |
| 2006/0210185 A1* | 9/2006 | Sun | H04N 19/176 382/240 |
| 2006/0233456 A1* | 10/2006 | Ahn | G06T 5/002 382/275 |
| 2006/0269159 A1* | 11/2006 | Kim | G06T 5/50 382/256 |
| 2008/0052066 A1* | 2/2008 | Oshikiri | G10L 21/038 704/221 |
| 2008/0298711 A1* | 12/2008 | Daly | G06T 5/004 382/264 |
| 2009/0060375 A1* | 3/2009 | Lim | G06T 5/002 382/266 |
| 2010/0135575 A1* | 6/2010 | Guo | H04N 9/646 382/164 |
| 2011/0194618 A1* | 8/2011 | Gish | G06T 5/50 375/240.25 |
| 2012/0314026 A1 | 12/2012 | Chen | |
| 2013/0107956 A1 | 5/2013 | Muijs | |
| 2013/0128122 A1* | 5/2013 | Wang | H04N 19/86 348/607 |
| 2013/0177066 A1* | 7/2013 | Ye | H04N 19/36 375/240.02 |
| 2013/0235072 A1 | 9/2013 | Longhurst | |
| 2014/0112394 A1 | 4/2014 | Sullivan | |
| 2014/0132429 A1* | 5/2014 | Scoville | H03M 7/30 341/87 |
| 2014/0185693 A1 | 7/2014 | Tourapis | |
| 2015/0201222 A1 | 7/2015 | Mertens | |
| 2015/0237322 A1* | 8/2015 | Stec | H04N 9/77 348/453 |
| 2015/0243200 A1 | 8/2015 | Pan | |
| 2015/0365688 A1* | 12/2015 | Su | H04N 19/11 375/240.03 |
| 2016/0021391 A1 | 1/2016 | Su | |
| 2016/0366422 A1* | 12/2016 | Yin | H04N 19/117 |
| 2018/0041759 A1 | 2/2018 | Froehlich | |
| 2018/0115774 A1 | 4/2018 | Su | |

FOREIGN PATENT DOCUMENTS

| | | |
|---|---|---|
| WO | 2015/180854 | 12/2015 |
| WO | 2016/140954 | 9/2016 |
| WO | 2017/003525 | 1/2017 |
| WO | 2017/165494 | 9/2017 |

OTHER PUBLICATIONS

Ito, T. et al "A Coding Method for High Bit-Depth Images Based on Optimized Bit-Depth Transform" Proc. of 2010 IEEE 17th International Conference on Image Processing, Sep. 26-29, 2010, Hong Kong, pp. 3141-3144.

* cited by examiner determine, over input codeword bins, minimal noise levels of an input bit depth 402 adjust the minimal noise levels to generate approximated minimal noise levels 404 use the approximated minimal noise levels to generate per-bin bit depths 406 classify the input codeword bins a first set having banding artifact risks and other sets 408 move bit depth to a first set of input codeword bins to generate modified per-bin bit depths 410 reshape the input images into reshaped images based on a forward reshaping function constructed from the modified per-bin bit depths 412 spatially filter the reshaped images to generate spatially filtered images 414 combine the spatially filtered images and the reshaped images 416

FIG. 4A

UP-CONVERSION TO CONTENT ADAPTIVE PERCEPTUAL QUANTIZATION VIDEO SIGNALS

CROSS REFERENCE TO RELATED APPLICATIONS

This application claims priority to U.S. Provisional Patent Application No. 62/565,382, filed on Sep. 29, 2017, and European Patent Application No. 17194053.9 filed on Sep. 29, 2017, the disclosures of which are incorporated herein by reference in their entirety.

TECHNOLOGY

The present invention relates generally to image processing, and in particular, to up-conversion to content adaptive perceptual quantization (CAQ) video signals.

BACKGROUND

The term "relatively high bit depth" as used herein may refer to a bit depth of a codeword space such as 11 bits of a 11-bit codeword space, 12+ bits of a 12+ bit codeword space, and so forth, that are higher than a relatively low bit depth such as 10 bits of a 10-bit codeword space, 9-bits of a 9-bit codeword space.

Different codewords mapped from pre-reshaped images may be collapsed into the same value or the same codeword in forward reshaping operations at an upstream device. Textual variations and image details represented in the pre-reshaped images may be lost in forward reshaped images. In addition, the pre-reshaped images themselves may already have banding artifacts before the forward reshaping operations. When a recipient system generated decoded images corresponding to the forward reshaped images, banding/contouring artifacts often occur in display images as a result of many-to-one mappings in the forward reshaping operations as well as the banding artifacts already existing in the pre-reshaped images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1A:
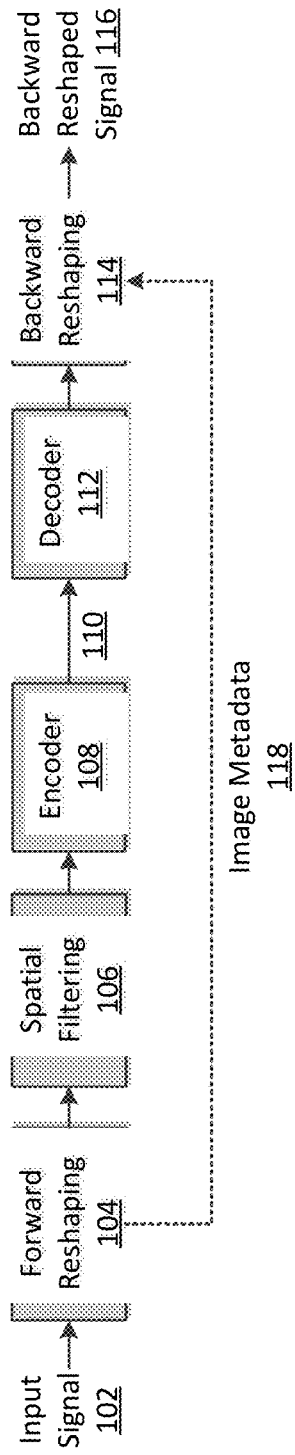
FIG. 1A and FIG. 1B illustrate example media processing/distribution pipelines.

Example embodiments, which relate to up-conversion to CAQ video signals, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEDIA PROCESSING/DISTRIBUTION PIPELINES
3. CONVERTING INPUT VIDEO CONTENT
4. CLASSIFYING LUMINANCE BINS
5. PRIORITY SETTINGS OF LUMINACE BINS
6. SELECTING LUMINANCE BINS FOR RANGE EXPANSION
7. FORWARD RESHAPING
8. SPATIAL FILTERING
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein are well suitable for a wide variety of media processing and distribution scenarios (e.g., broadcasting scenario, etc.) where input video signals (e.g., non-CAQ video signals of relatively low bit depths, 10-bit high dynamic range (HDR) signals, etc.) are to be up-converted into CAQ video signals (e.g., CAQ video signals of bit depths that are no less than the relatively low bit depths of the input video signals, 10-bit CAQ signals, 12+ bit CAQ signals, etc.).

In some embodiments, an input video signal to a video content processing/distribution pipeline for processing, converting and/or distributing may represent a video signal of a relatively low bit depth (e.g., a 10-bit video signal, etc.). For example, original video content of a relatively high bit depth (e.g., video content in 12+ bit, etc.) as generated by image sensors of cameras may be truncated into the input video signal of the relatively low bit depth (e.g., a 10-bit signal, etc.) by bit shift operations that remove the least significant bits (e.g., 2+ bits, etc.) of the original video content of the relatively high bit depth. The input video signal of the relatively low bit depth (e.g., keeping the most significant bits of the original video content, etc.) may still cover a dynamic range up to 10,000 or 4,000 nits, which is (e.g., fully, approximately, etc.) the same dynamic range as covered by the original video content of the relatively high bit depth. In a non-limiting example, the input video signal of the relatively low bit depth may represent an input perceptual quantized (PQ) video signal in a broadcasting application, and may be inputted from camera through a 10-bit High Definition Serial Digital Interface (HD-SDI).

The techniques as described herein can be used to up-convert the input video signal to a CAQ signal (e.g., a CAQ video signal no lower than 10 bits, etc.) to avoid potential banding artifact for better image/video quality. In some embodiments, at least some of these techniques can be implemented through a reshaping module in a video encoder before the video encoder applies video compression to generate an output video signal to be transmitted to recipient devices. More specifically, the video encoder receives the input video signal of the relatively low bit depth; performs reshaping (e.g., in combination with spatial filtering) on the input video signal; generates, based on the reshaped video signal, a CAQ video signal as the output video signal.

A reshaping method under techniques as described herein can be used to process input video signals (e.g., 12+ bit video signals, etc.) having higher bit depths (e.g., 12+ bits, etc.) than those (e.g., 10 bits, etc.) of output video signals (e.g., 10-bit video signals, etc.) as well as input video signals (e.g., 10-bit video signals, etc.) having the same bit depths as, and even lower bit depth, than those of output video signals (e.g., 10-bit video signals, etc.).

In scenarios in which an input video signal (e.g., a video signal of a relatively high bit depth, etc.) has a higher bit depth than the bit depth of an output video signal generated from the input video signal, the total number of available codewords to code the input video signal is more than the total number of available codewords to code the output video signal. Thus, the input video signal is "compressed" by grouping several input codewords together as a new codeword in the output domain (output codeword space).

In scenarios in which an input video signal (e.g., a video signal of a relatively low bit depth, etc.) has the same bit depth as the bit depth of an output video signal generated from the input video signal, the total number of available codewords to code the input video signal is the same as or comparable to the total number of available codewords to code the output video signal. In some embodiments, the input video signal may have lost least-significant-bit (LSB) information, and may be of a bit depth (e.g., 10 bits, etc.) lower than the minimum bit depth (e.g., 12+ bits, etc.) at which banding artifacts can be avoided in smooth areas. A reshaping method as described herein can be used to reduce or avoid banding artifacts in a reshaped video signal generated from reshaping the input video signal. Additionally, optionally or alternatively, spatial filtering operations can be performed on the reshaped video signal to increase the portion of bit depth (or the portion of codewords in the codeword space) to code image content in smooth areas of images and to prevent or reduce banding artifacts in the smooth areas.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MEDIA PROCESSING/DISTRIBUTION PIPELINES

FIG. 1A illustrates an example media processing/distribution pipeline in which an input video signal 102 is processed into an output video signal 110 by an upstream device. The input video signal (102) may be a 10-bit HDR signal (e.g., HDR10 signal, etc.). The output video signal (110) may be a 10-bit CAQ signal (e.g., a 10-bit Dolby Vision CAQ signal, etc.).

Input images in the input video signal (102) are first forward reshaped into forward reshaped images by a forward reshaping operation 104, for example based at least in part on a forward reshaping function (e.g., a 10-bit to 10-bit forward reshaping, etc.). As used herein, "forward reshaping" refers to an operation that converts an input video signal of an input bit depth to a reshaped video signal of a reshaped bit depth; the reshaped video signal may be of the same bit depth of an output video signal further derived (at least in part) from the reshaped video signal.

Image metadata 118 may be generated based at least in part on the forward reshaped function, and may be transmitted or otherwise provided by the upstream device to a recipient device for the recipient device to use the image metadata (118) to construct a backward reshaping function (e.g., a multi-segment backward reshaping function, an 8-segment polynomial pieces, etc.). As used herein, "backward reshaping" may refer to an operation that reverses the effect of a forward reshaping operation in a decoded video signal.

In some embodiments, a spatial filtering operation 106 is applied on the input images to generate spatially filtered images, which may be combined the forward reshaped images generated by the forward reshaping operation (104) into reshaped and spatially filtered images. The reshaped and spatially filtered images may be compressed into the output video signal (110), for example as a 10-bit CAQ signal.

The output video signal (110) is transmitted or otherwise provided to the recipient device (or receiver device), and is decoded by a decoder 112 of the recipient device into decoded images, which have been forward reshaped and spatially filtered by the upstream device.

In some embodiments, the decoded images may be used to generate directly display images to be rendered on an image display. In some embodiments, the decoded images may be backward reshaped by a backward reshaping operation 114 into backward reshaped images of a backward reshaped signal 116, for example based at least in part on the backward reshaping function constructed from the image metadata (118).

The backward reshaped images of the backward reshaped signal (116) may be used to generate the display images to be rendered on the image display.

Additionally, optionally or alternatively, as a part of generating the display images, display management (DM) operations, inverse mapping operations, and so forth, may be performed on the reshaped and spatially filtered images, for example, based on one or more of: DM metadata, inverse mapping metadata, and so forth, extracted from the decoded reshaped video signal.

Figure 1B:
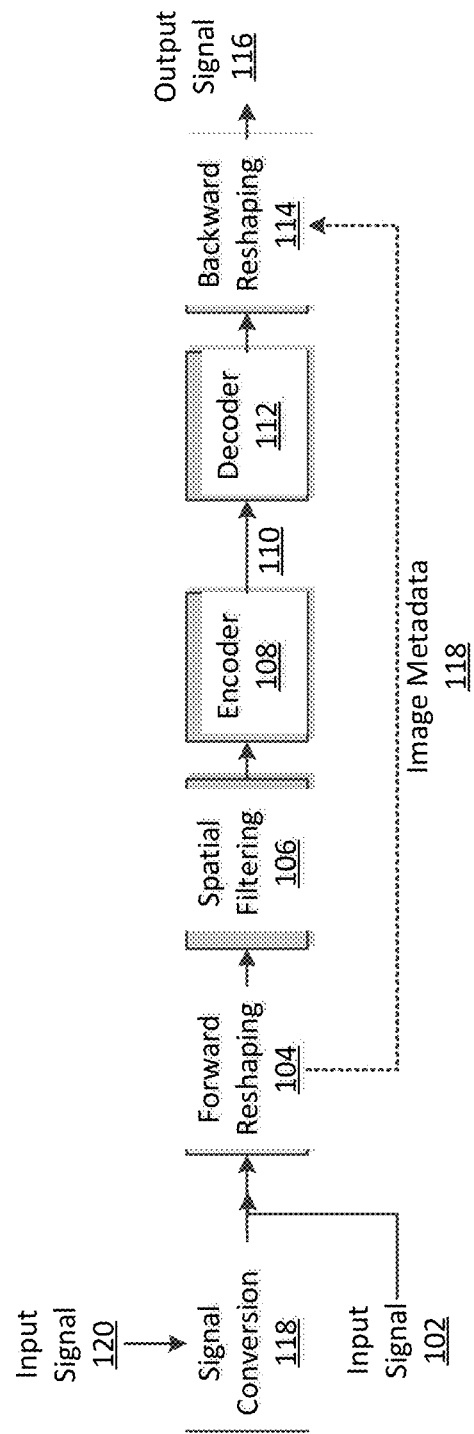

FIG. 1B illustrates another example media processing/distribution pipeline. In some embodiments, the forward reshaping operation (104) may be configured to forward reshape input images from input video signals that comply with a specific signal format specification (e.g., a specific color space, etc.) such as 10-bit HDR signals (or images therein). The media processing/distribution pipeline may comprise a signal conversion operational unit 118 that accepts input video signals (e.g., 120, etc.) that do not comply with the specific signal format expected by the forward reshaping operation (104). In some embodiments, the signal conversion operational unit (118) receives an input video signal 120 that complies with a hybrid log gamma (HLG) signal format (or that is generated based on an HLG transfer function (e.g., HLG electro-optical transfer function (EOTF), etc.) different from a CAQ transfer function (e.g., a CAQ EOTF, etc.) expected by the forward reshaping operation (104)), converts the input video signal (120) into a converted video signal that complies with the specific signal format specification such as 10-bit HDR signals, and provides the converted video signal for the forward reshaping operation (104) to process further. The conversion of the input video signal (120) may include, but is not necessarily limited to only, a color space conversion, a non-linear dynamic range mapping, etc.

3. CONVERTING INPUT VIDEO CONTENT

In some embodiments, the media processing/distribution pipeline implements a framework for converting or up-converting input video content into output CAQ video content. Example processing components in the framework may include, but are not necessarily limited to only, forward reshaping, spatial filtering, and so forth.

In the framework, individual per-bin bit depths for a plurality of luminance bins of an output dynamic range covered in the output video signal may be estimated based on image content (e.g., content-dependent pixel values or codewords, etc.) in the input video signal.

In response to determining that an estimated per-bin bit depth for a luminance bin in the plurality of luminance bins exceeds the total number of available codewords proportional to the luminance bin, the upstream device can identify the luminance bin as one of relatively high risks to have banding artifacts, and seek to assign a higher bit depth to the luminance bin than the estimated bit depth.

To increase the total number of available codewords in the estimated bit depth to the increased number of available codewords in the assigned bit depth for the luminance bin, the upstream device may make rooms from other lower-bit-depth luminance bins in the dynamic range covered by the input video signal by squeezing out non-used codewords from the other luminance bins.

In scenarios in which there may not be a sufficient number of extra or squeezed-out codewords from the lower-bit-depth luminance bins to use in luminance bins of relatively high risks to banding artifacts, different priorities may be assigned to different luminance bins in the luminance bins of relatively high risks to banding artifacts. The different priorities may be used to select or prioritize the different luminance bins of relatively high risks to banding artifacts for receiving (or increasing) available codewords from the lower-bit-depth luminance bins.

After determining or selecting specific luminance bins in luminance bins of relatively high risks to receive (or increase) available codewords from the other luminance bins, the forward reshaping function can be constructed and used to perform the forward reshaping operation (104). The forward reshaping operation (104) may not be able to create more available codewords beyond the total number of available codewords in the reshaped domain (or in the total number of available codewords in the reshaped codeword space). The forward reshaping function may be a one-dimension functional comprising one-to-one or many-to-one mappings from input codewords to reshaped codewords, for example without one-to-many mappings from input codewords to reshaped codewords.

To further increase the bit depth in smooth areas of images, the spatial filtering operation (106) may use a resamping filter, a debanding filter, a blurring filter, and so forth, to increase the total number of distinct used codewords in the luminance bins of relatively high risks of having banding artifacts. Based at least in part on the reshaping operation (104) and/or the spatial filtering operation (106), the input video signal can be converted or up-converted into the output video signal with increased fidelity and better visual quality.

In contrast, under other approaches, noise might be injected in luminance subranges of relatively high risks of having banding artifacts. However, the noise injection would decrease fidelity in these luminance subranges and thus negatively impact compression efficiency and visual quality.

Figure 2:
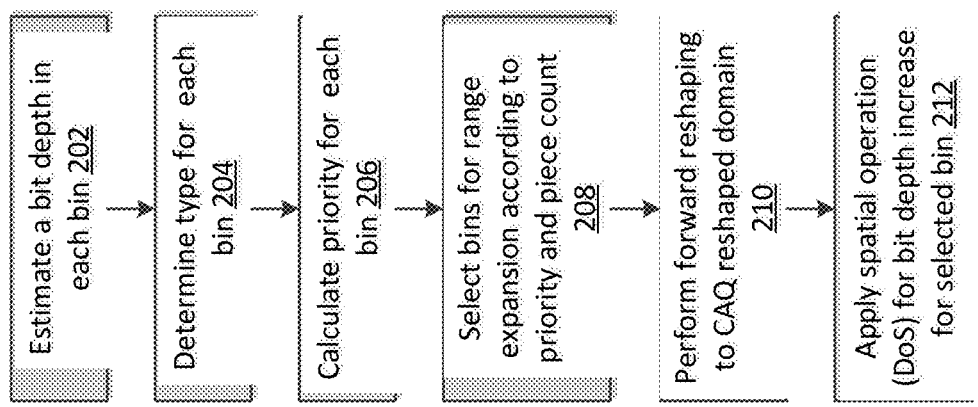
FIG. 2 illustrates an example flowchart performed by a media processing/distribution pipeline.

FIG. 2 illustrates an example flowchart performed with one or more processing components of the framework implemented by the media processing/distribution pipeline.

In block 202, the upstream device estimates a bit depth in each luminance bin (or each codeword bin) in a plurality of luminance bins (or a plurality of codeword bins). The plurality of luminance bins used to partition or divide a dynamic range covered by the input video signal. Example bit depth estimation can be found in PCT Application PCT/US2016/020230, filed on Mar. 1, 2016, entitled "CONTENT-ADAPTIVE PERCEPTUAL QUANTIZER FOR HIGH DYNAMIC RANGE IMAGES" by Jan Froehlich et al.; and PCT Application PCT/US2016/020232, filed on Mar. 1, 2016, entitled "REAL-TIME CONTENT-ADAPTIVE PERCEPTUAL QUANTIZER FOR HIGH DYNAMIC RANGE IMAGES" by Guan-Ming Su. The above-mentioned patent applications are hereby incorporated by reference as if fully set forth herein.

For the purpose illustration only, denote the (overall) bit depth for the input (or original) video signal as $B_I$ and the (overall) bit depth for the output (or truncated) video signal in the pipeline as $B_T$.

In some embodiments, one or both of the input and output dynamic ranges (or luminance ranges) of the input and output video signals are normalized into normalized (luminance) value range(s) such as zero (0) to one (1). For example, the (e.g., entire, etc.) dynamic ranges of the input and output video signals may be normalized by dividing luminance values with $2^{B_I}$ and $2^{B_T}$ respectively. The dynamic range of the input video signal as normalized may be partitioned or divided into the plurality of luminance bins such as ten (10) luminance bins, sixteen (16) luminance bins, etc.

In some embodiments, a minimal noise level (or a noise measurement) in each luminance bin in the plurality of luminance bins of an input image in the input video signal may be determined based on high frequency components in the input image. In these embodiments, to determine the minimal noise level, a filtered image with low frequency components may first be generated by filtering out (e.g., through a 2D Gaussian filter, etc.) high frequency components in the input image. The high frequency components in the input image may be obtained by subtracting the filtered image with the low frequency components from the input image comprising both the low and high frequency components.

Subsequently, based on the high frequency components in the input image, the minimal noise level in each luminance bin in the plurality of luminance bins is determined. For example, pixels in the input image that fall within a luminance bin may be identified or determined based on luminance values of the pixels. The minimal noise level in each luminance bin may be determined as the lowest noise level among all the noise levels of all the pixels in each such luminance bin.

In some embodiments, a minimal noise level (or a noise measurement) in each luminance bin in the plurality of luminance bins of an input image in the input video signal may be determined based on block-based standard deviations in the input image. In these embodiments, to determine the minimal noise level, the input image is divided into pixel blocks and a complexity metric of each block such as its standard deviation is computed. Subsequently, based on block-based complexity metrics such as standard deviations for the pixel blocks in the input image, the minimal noise level in each luminance bin in the plurality of luminance bins is determined. Example noise measurements using block-based complex metrics such as standard deviations can be found in U.S. patent application Ser. No. 15/418,199, filed on Jan. 27, 2017, entitled "BLOCK-BASED CONTENT-ADAPTIVE RESHAPING FOR HIGH DYNAMIC RANGE IMAGES" by Amin Kheradmand, Guan-Ming Su and Cheng-Chi Li; U.S. patent application Ser. No. 15/648,125, filed on Jul. 12, 2017, entitled "SINGLE-PASS AND MULTI-PASS-BASED POLYNOMIAL APPROXIMATIONS FOR RESHAPING FUNCTIONS" by Harshad Kadu, Subhayan Mukherjee and Guan-Ming Su, which is hereby incorporated by reference as if fully set forth herein.

In operational scenarios in which the input video signal already has relatively high risks of banding artifacts such as in the case of a 10-bit input video signal, if the minimal noise level of each luminance bin as computed from the input video signal is used to determine directly a bit depth of the output video signal for each such luminance bin, the directly determined bit depth may not be sufficiently large to prevent or reduce the banding artifacts in each such luminance bin.

Under techniques as described herein, minimal noise levels as determined based on the image content of the input video signal of the relatively low bit depth (e.g., 10 bits, etc.) are used to estimate corresponding minimal noise levels of a video signal of a reference bit depth (e.g., 16 bits, etc.) that comprises the same image content of the input video signal without banding artifacts (or with no or little risks of banding artifacts).

For example, a minimal noise level of the input video signal of the relatively low bit depth (e.g., 10) may be used to estimate a corresponding minimal noise level of the video signal of the reference bit depth (e.g., 16) for luminance bin m, as follows:

$$b_m^{16} = b_m^{10} - \alpha \frac{1}{2^{B_I}} \quad (1)$$

The bit depth for luminance bin m may be computed based on the estimated (or approximated) minimal noise level (instead of based directly on the minimal noise level computed from the input video signal), as follows:

$$\hat{Q}_m^{16} = f(b_m^{16}) = f\left(b_m^{10} - \alpha \frac{1}{2^{B_I}}\right) \quad (2)$$

where $b_m^{10}$ is the minimal noise level measured from the input video signal for luminance bin m; f( ) is a mapping function used to map the minimal noise level of the luminance bin m to a corresponding bit depth for luminance bin m; α represents a scaling factor. In various embodiments, an optimal value (e.g., 0.100, 0.095, 0.080, 0.075, 0.070, etc.) for the scaling factor α can be manually inputted, empirically chosen, determined through machine learning, etc.

Figure 3A:
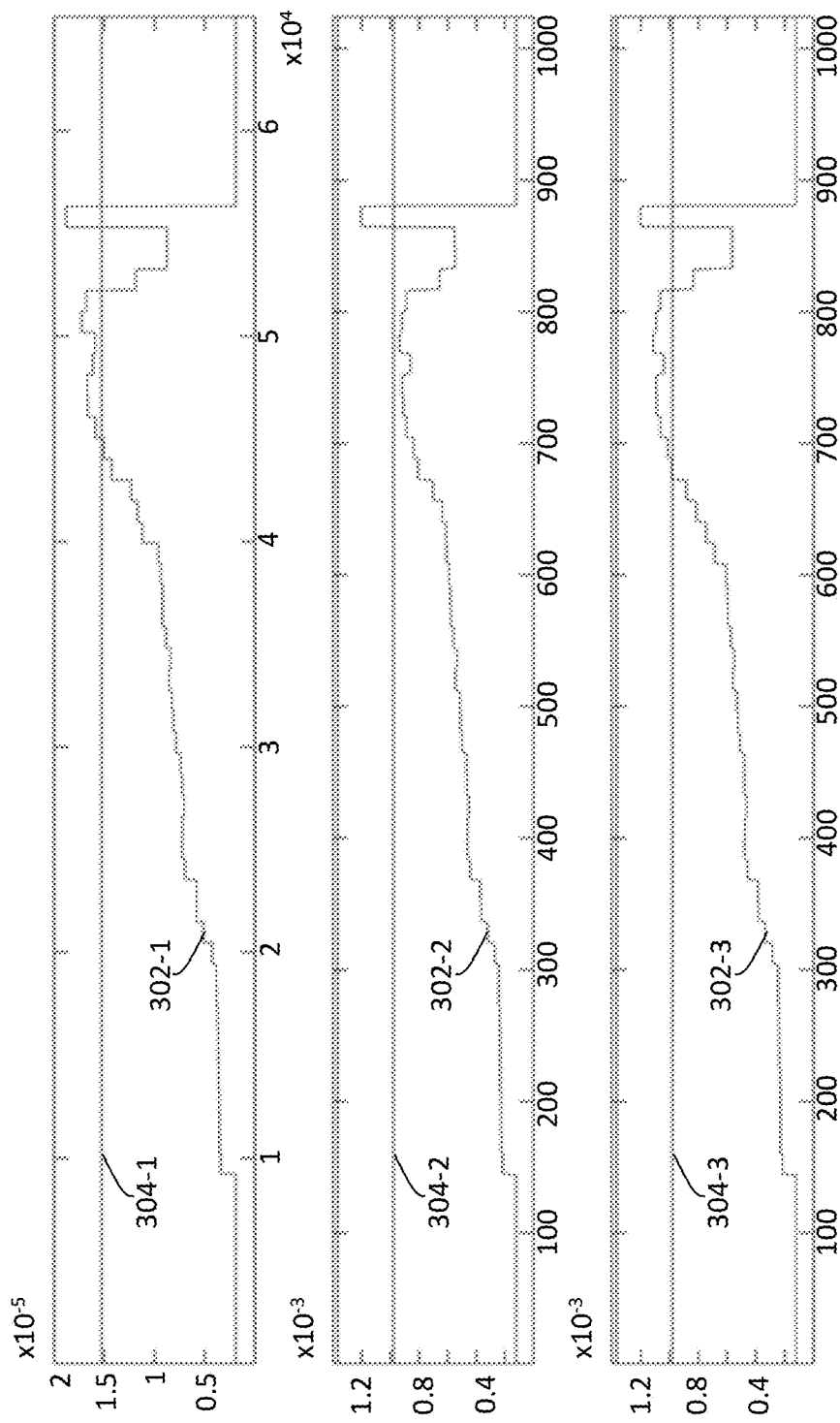
FIG. 3A illustrates example bit depth plots for comparison.

FIG. 3A illustrates some example bit depth plots for comparison. In FIG. 3A, the horizontal axes in represent luminance values of luminance bins, whereas the vertical axes represent bit depths over the luminance bins. A first bit depth plot 302-1 is computed directly from a 16-bit image. A second bit depth plot 302-2 is computed directly from a 10-bit image having the same image content as the 16-bit image. A third bit depth plot 302-3 is estimated from the minimal noise levels computed for the luminance bins from the 10-bit image by using a sampling point offset term as represented by the scaling factor term in expressions (1) and (2) above.

A first line 304-1 represents a (per-bin) bit depth threshold above which there are risks of banding artifacts in the 16-bit image. A second line 304-2 represents a (per-bin) bit depth threshold above which there are risks of banding artifacts in images of an overall target bit depth (e.g., 10 bits, etc.) in the output video signal. A third line 304-3 represents the same (per-bin) bit depth threshold above which there are risks of banding artifacts in images of the target bit depth (e.g., 10 bits, etc.) in the output video signal. A (per-bin) bit depth threshold as described herein for images of an overall bit depth such as the target bit depth and so forth may be set to be a value dependent on the overall bit depth.

In a first non-limiting example, the (per-bin) bit depth threshold may be set to be proportional to the ratio of the overall bit depth (e.g., 10 bits in a 10-bit video signal, 16 bits in a 16-bit video signal, etc.) over (or divided by) the total number of luminance bins in the plurality of luminance bins. For the purpose of illustration only, luminance bins in the plurality of luminance bins are of equal widths.

In a second non-limiting example, the (per-bin) bit depth threshold may be scaled by multiplying with the total number of luminance bins in the plurality of luminance bins so that the (per-bin) bit depth threshold is the same as the overall bit depth. To determine whether a per-bin bit depth exceeds the per-bin depth threshold, the per-bin bit depth may also be scaled by multiplying with the total number of luminance bins in the plurality of luminance bins, before being compared with the per-bin depth threshold that have been scaled with the same total number of luminance bins.

As shown in FIG. 3A, the first bit depth plot (302-1) has relatively low risks of banding artifacts as most of the bit depths per luminance bin as represented by the first bit depth plot (302-1) are below the bit depth threshold as represented by the first line (304-1). In comparison, the second bit depth plot (302-2) may understate risks of banding artifacts as relatively few bit depths per luminance bin as represented by the second bit depth plot (302-2) are above the bit depth threshold as represented by the second line (304-2). The third bit depth plot (302-3), as computed from adjusted/approximated minimal noise levels, has similar characteristics in bit depths per luminance bins to those of the first bit depth plot (302-1). For example, the third bit depth plot (302-3) has similar characteristics in bit depths per luminance bins above the bit depth threshold as represented by the third line (304-3) to those of the first bit depth plot (302-1) above the bit depth threshold as represented by the first line (304-1).

Thus, in reference to the first bit depth plot (302-1), the third bit depth plot (302-3) has a better bit depth estimation than the second bit depth plot (302-2) directly computed from the per-bin minimal noise level, the latter of which exhibits under-estimation for several luminance bins that might already suffer banding artifacts.

4. CLASSIFYING LUMINANCE BINS

Referring back to FIG. 2, after estimating the (per-bin) bit depth $\hat{Q}_m^{16}$ in each luminance bin in the plurality of luminance bins, in block 204, the upstream device may classify individual luminance bins in the plurality of luminance bins into different luminance bin types. For example, the upstream device can identify specific luminance bins for which the estimated bit depth $\hat{Q}_m^{16}$ exceeds the bit depth threshold for images of the target bit depth of the output video signal. Additionally, optionally or alternatively, the upstream device can identify pixels associated with these specific luminance bins as having relatively high risks of generating banding artifacts.

By way of illustration but not limitation, the upstream device classifies a first set (denoted as $\Theta_H$) of luminance bins that need more than their respective portions (e.g., the bit depth threshold, etc.) of the overall bit depth (e.g., 10 bits, etc.) as a luminance bin type of relatively high risks of banding artifacts, as follows:

$$\Theta_H = \{m | \hat{Q}_m^{16} > B_T\} \quad (3)$$

where the estimated bit depths $\hat{Q}_m^{16}$ has been multiplied or scales with the total number M of luminance bins in the plurality of luminance bins, assuming luminance bins in the plurality of luminance bins are of equal widths; and the bit depth threshold (e.g., 304-2 or 304-3 of FIG. 3A, etc.) has been correspondingly multiplied or scales with the total number M of luminance bins in the plurality of luminance bins to become the target bit depth $B_T$ of the output video signal. Thus, the scaled estimated bit depth $\hat{Q}_m^{16}$ can be directly compared with the target bit depth $B_T$ as illustrated in expression (3) above.

The upstream device classifies a second set (denoted as $\Theta_H$) of luminance bins that need much less than their respective portions of the overall bit depth (e.g., 10 bits, etc.) as a luminance bin type of relatively low risks of banding artifacts, as follows:

$$\Theta_L = \{m | \hat{Q}_m^{16} < B_L\} \quad (4)$$

where $B_L$ denotes a second low bit depth threshold $B_L$ (e.g., 8 or 9 bits, etc.), one or two bits fewer than the bit depth threshold $B_T$ (e.g., 10 bits, etc.). Extra available codewords may be extracted or squeezed out from luminance bins in the second set of luminance bins by reducing bit depths in the second set $\Theta_L$. These extra available codewords may be moved out of the second set $\Theta_L$ to be used to code pixel values of pixels that fall within the first set $\Theta_H$.

The upstream device may determine the minimum pixel value (e.g., the minimum luminance value, etc.) and the maximum pixel value (e.g., the maximum luminance value, etc.) for an input image, a group of images, a scene, etc., in the input video signal. As used herein, the term "scene" or "a group of images" refers to a set of consecutive images with similar color and/or dynamic range characteristics. A forward reshaping function and/or a corresponding backward reshaping function as described herein may be constructed for one of: a single image, a single group of pictures, a scene, a time window within a single scene or a single media program, etc. The upstream device can identify a third set $\Theta_Z$ of luminance bins within which all pixel/luminance values fall below the minimum pixel/luminance value or above the maximum pixel/luminance value, as follows:

$$\Theta_Z = \{m | \hat{Q}_m^{16} = 0\} \quad (5)$$

As shown in expression (5), (per-bin) bit depths can be set to zero (0) for the third set of luminance bins. As no bit depth or available codewords need to be assigned to the third set $\Theta_Z$, all available codewords that would otherwise be assigned to the third set $\Theta_Z$ can be extracted and used to code pixel values of pixels in other sets of luminance bins.

In some embodiments, bit depths as determined under techniques as described herein may be used to construct the forward reshaping function that are represented or approximated by a plurality of polynomial pieces. In these embodiments, the pixel/luminance values below the minimum pixel/luminance value and above the maximum pixel/luminance value can be represented by pivot points (or constant values) of the polynomial pieces used to represent or approximate the forward reshaping function.

The upstream device may identify any remaining luminance bins, other than the first, second and third sets of luminance bins, as a fourth set $\Theta_C$ of luminance bins, as follows:

$$\Theta_C = \{m | B_L \leq \hat{Q}_m^{16} \leq B_T\} \quad (6)$$

In some embodiments, bit depths for the fourth set $\Theta_C$ may be maintained.

The total number of set elements (or luminance bins) in the first, second, third and fourth sets equals the total number of luminance bins (in the plurality of luminance bins) denoted as M, as follows:

$$|\Theta_H| + |\Theta_L| + |\Theta_Z| + |\Theta_C| = M \quad (7)$$

where || represents the magnitude or the total number of set elements in a set or set.

The upstream device may allocate additional codewords, for example above the bit depth threshold $B_T$, to the first set $\Theta_H$ of luminance bins. In some embodiments, the upstream device can determine an expansion factor β that is to be used for allocating the additional codewords to the first set $\Theta_H$ of luminance bins. The expansion factor $\beta$ may be determined through empirical studies, manual inputs, machine learning, etc. In some embodiments, the expansion factor $\beta$ is so selected that the total number of available codewords in a luminance bin in the first set $\Theta_H$ is equivalent to the total number of available codewords in a video signal of an elevated bit depth (e.g., 11 bits, etc.) higher than the bit depth (e.g., 10 bits, etc.) of the output video signal (which may be the same as the input video signal in some operational scenarios).

The elevated bit depth may represent a bit depth at which banding artifacts can be significantly prevented or reduced. In some embodiments, the elevated bit depth may have one or two bits than the bit depth of the output video signal.

In a non-limiting example, the elevated bit depth may be selected to be 11 or more (11+) bits. Based on the elevated bit depth, the upstream device may determine the expansion factor $\beta$, as follows:

$$\beta = 2^{11-B_T} \quad (7)$$

The upstream device can increate a (per-bin) bit depth allocated to a luminance bin in the first set $\Theta_H$ of luminance bins beyond a proportional (per-bin) bit depth $2^{B_T}/M$ for the luminance bin. The upstream can allocate an increased bit depth $\beta \cdot 2^{B_T}/M$, instead of the proportional bit depth $2^{B_T}/M$, to the luminance bin in the first set $\Theta_H$ of luminance bins.

The expansion factor may, but is not necessarily limited to only, be set to the same value for all the luminance bins in the first set $\Theta_H$ of luminance bins. For these luminance bins, the total or aggregate bit depth allocated to the first set $\Theta_H$ of luminance bin may be determined as follows:

$$|\Theta_H| \cdot (\beta - 1) \cdot 2^{B_T}/M \quad (8)$$

The extra (per-bin) bit depths, or the corresponding extra available codewords represented by the extra bit depths, may be obtained by reducing bit depths in (or squeezing available codewords out from) luminance bins in the second and third sets $\Theta_L$ and $\Theta_Z$.

Since luminance bins in the third set $\Theta_Z$ do not need any bit depth, the bit depths squeezed out from the third set $\Theta_Z$ are $|\Theta_Z| \cdot 2^{B_T}/M$. Since luminance bins in the second set $\Theta_L$ need at most one half of the proportional bit depth $2^{B_T}/M$, the bit depths squeezed out from the second set $\Theta_L$ are $0.5 \cdot |\Theta_L| \cdot 2^{B_T}/M$. Thus, the total bit depth that can be squeezed out from the second and third sets $\Theta_L$ and $\Theta_Z$ can be determined as follows:

$$|\Theta_Z| \cdot 2^{B_T}/M + 0.5 \cdot |\Theta_L| \cdot 2^{B_T}/M = (|\Theta_Z| + 0.5 \cdot |\Theta_L|) \cdot 2^{B_T}/M \quad (9)$$

The extra bit depths allocated to the first set $\Theta_H$ should be no larger than the total bit depth (or bit depth budget) squeezed from the second and third sets $\Theta_L$ and $\Theta_Z$. The upstream device may determine the upper bound U for a total number of luminance bins in the first set $\Theta_H$ to be expanded with extra bit depth, as follows:

$$U = \text{floor}\left(\frac{|\Theta_Z| \cdot 0.5 \cdot |\Theta_L|}{(\beta - 1)}\right) \quad (10)$$

5. PRIORITY SETTINGS OF LUMINACE BINS

In response to determining that the upper bound U is no less than the total number of luminance bins in the first set $\Theta_H$, the upstream device can allocate extra bit depths to all the luminance bins in the first set $\Theta_H$, so that these luminance bins would have available codewords that are equivalent to those of the elevated bit depth (e.g., 11 bits, etc.) instead of the bit depth (e.g., (10 bits, etc.) of the output video signal.

On the other hand, in response to determining that the upper bound U is less than the total number of luminance bins in the first set $\Theta_H$, in block 206 of FIG. 2, the upstream device determines priority settings for all the luminance bins in the first set $\Theta_H$.

The upstream device may assign each luminance bin in the first set $\Theta_H$ a priority based on one or more of the following considerations:

Lower noise consideration: luminance bins with relatively low noise levels as measured from the input video signal (or relatively high estimated bit depths) may be assigned with higher priority than luminance bins with relatively high noise levels as measured from the input video signal (or relatively low estimated bit depths), since the former luminance bins have higher risks or potential to have banding artifacts.

Longer range consideration: longer continuously connected luminance bins in the first set $\Theta_H$ may be assigned with higher priority than not connected or shorter connected luminance bins in the first set $\Theta_H$, as the latter luminance bins represent scattered luminance bins that might not be approximated well with a multi-segment backward reshaping function (e.g., 8-segment polynomial pieces, etc.) that can be used by recipient devices to perform backward reshaping operations (e.g., 114 of FIG. 1A, etc.). The scattered luminance bins may need or waste too many segments to be used out of a relatively limited number of segments in the multi-segment backward reshaping function. In contrast, continuously connected luminance bins can be approximated with relatively few segments in the multi-segment backward reshaping function.

Bright area consideration: luminance bins with relatively bright luminance values may be assigned with higher priority than luminance bins with relatively dark luminance values, as perceptual quantization may assign relatively few codewords to the relatively bright luminance values. To avoid potential coding artifacts such as quantization errors or coding errors, luminance bins in the relatively bright luminance ranges may be given higher priority to increase bit depths in the relatively bright luminance ranges.

In some embodiments, these considerations may be given equal weights in assigning specific priority settings to luminance bins in the first set $\Theta_H$. In some other embodiments, these considerations may be given differential weights in assigning specific priority settings to luminance bins in the first set $\Theta_H$.

In some embodiments, these considerations may be applied in sequence from the highest importance to the lowest importance. For example, priority settings may be assigned to luminance bins in the first set $\Theta_H$ based on the first (lower noise consideration: the lower the noise level, the higher the priority setting) of the considerations. Subsequent considerations (e.g., longer range consideration, bright area consideration, etc.) may be used as tie breakers if preceding considerations do not resolve the priority settings.

TABLE 1 illustrates an example classification of luminance bins for an image, a group of pictures, a scene, etc., of an input video signal.

TABLE 1

| Bin $m_i$ | 0 | 1 | 2 | 3 | 4 | 5 | 6 | 7 | 8 | 9 | 10 | 11 | 12 |
|---|---|---|---|---|---|---|---|---|---|---|---|---|---|
| Type | $\Theta_Z$ | $\Theta_C$ | $\Theta_H$ | $\Theta_H$ | $\Theta_H$ | $\Theta_C$ | $\Theta_H$ | $\Theta_C$ | $\Theta_C$ | $\Theta_H$ | $\Theta_H$ | $\Theta_H$ | $\Theta_C$ |
| $\hat{Q}_m^{16}$ | 0 | 9.5 | 10.3 | 10.3 | 10.3 | 9.1 | 10.3 | 9.2 | 9.5 | 10.3 | 10.3 | 10.1 | 9.0 |

As shown in TABLE 1, a plurality of luminance bins used to divide the (e.g., entire, substantially entire, etc.) dynamic range of the input video signal comprises thirteen (13) luminance bins. Scaled estimated bit depths $\hat{Q}_m^{16}$ for corresponding luminance bins in the plurality of luminance bins may be estimated (e.g., in block 202 of FIG. 2) from minimal noise levels in the corresponding luminance bins as measured from the image, the group of pictures, the scene, etc., the input video signal.

Given the scaled estimated bit depths $\hat{Q}_m^{16}$, the corresponding luminance bins may be classified into different luminance bin types based on the bit depth threshold (or the target bit depth) $B_T$ (e.g., 10 bits, etc.) and the second bit depth threshold (or a bit depth one or two bits lower than the target bit depth) $B_L$ (e.g., 8, etc.). For example, luminance bins with relatively high risks of banding artifacts or with the scaled estimated bit depths $\hat{Q}_m^{16}$ above the bit depth threshold $B_T$ may be classified into a first set $\Theta_H$ of luminance bins, as follows:

$$\Theta_H = \{2,3,4,6,9,10,11\} \quad (11)$$

$$|\Theta_H| = 7 \quad (12)$$

Luminance bins with relatively low risks of banding artifacts or with the scaled estimated bit depths $\hat{Q}_m^{16}$ below the second bit depth threshold $B_L$ may be classified into a second set $\Theta_L$ of luminance bins, as follows:

$$\Theta_L = \{\ \} \quad (13)$$

$$|\Theta_L| = 0 \quad (14)$$

Luminance bins within which all pixel/luminance values fall below the minimum pixel/luminance value or above the maximum pixel/luminance value may be classified into a third set $\Theta_Z$ of luminance bins, as follows:

$$\Theta_Z = \{0\} \quad (15)$$

$$|\Theta_Z| = 1 \quad (16)$$

Any remaining luminance bins, other than the first, second and third sets of luminance bins, may be classified into a fourth set $\Theta_C$ of luminance bins, as follows:

$$\Theta_C = \{1,5,7,8,12\} \quad (17)$$

$$|\Theta_C| = 5 \quad (18)$$

Based on a number of considerations such as lower noise consideration, longer range consideration, brighter area consideration, and so forth, luminance bins (denoted as $\hbar_j$) in the first set of luminance bins may be prioritized with different priority settings, as shown in TABLE 2 below.

TABLE 2

| Priority | 0 | 1 | 2 | 3 | 4 | 5 | 6 | 7 | 8 | 9 | 10 | 11 | 12 |
|---|---|---|---|---|---|---|---|---|---|---|---|---|---|
| Bin $\hbar_j$ | 4 | 3 | 2 | 10 | 9 | 6 | 11 | | | | | | |

As shown in TABLE 2, luminance bins 4, 3 and 2 have been given the highest priority settings as these luminance bins have the highest scaled estimated bit depths $\hat{Q}_m^{16}$ in TABLE 1 and as these luminance bins are the longest continuously connected. Among luminance bins 4, 3 and 2, the highest priority setting is given to the brightest one or luminance bin 4. While having the same scaled estimated bit depths as luminance bins 4, 3 and 2, luminance bins 10 and 9 have been given the next highest priority settings as these luminance bins are the next longest continuously connected as compared with luminance bins 4, 3 and 2. Among luminance bins 10 and 9, the higher priority setting is given to the brighter one or luminance bin 10. Luminance bins 6 and 11 have been given lower priority settings, as the scaled estimated bit depths $\hat{Q}_m^{16}$ for luminance bins 6 and 11 are smaller as compared with the other luminance bins in the first set $\Theta_H$ of luminance bins. Among luminance bins 6 and 1, the higher priority setting is given to luminance bin 6 with the higher scaled estimated bit depth $\hat{Q}_m^{16}$.

6. SELECTING LUMINANCE BINS FOR RANGE EXPANSION

In some embodiments, after determining the priority settings for all the luminance bins $\hbar_j$ in the first set $\Theta_H$, in block 208, the upstream device selects up to the upper bound U of luminance bins with relatively high priority settings from the first set $\Theta_H$ for receiving extra bit depths squeezed out from the second and third sets $\Theta_L$ and $\Theta_Z$. The upstream device can allocate extra bit depths to the selected luminance bins in the first set $\Theta_H$, so that these luminance bins would have available codewords that are equivalent to those of the elevated bit depth (e.g., 11 bits, etc.) instead of the bit depth (e.g., 10 bits, etc.) of the output video signal.

In some embodiments, the selection of luminance bins of the relatively high priority settings for receiving extra bit depths may be subject to a number-of-segment constraint for the (e.g., multi-segment, etc.) forward reshaping function.

By way of example but not limitation, the multi-segment backward reshaping function comprises 8-segment polynomial pieces in the backward reshaping. Accordingly, the number-of-segment constraint in this illustrated example may be eight (8).

TABLE 3 below illustrates an example procedure (e.g., an iterative procedure, etc.) that can be used to search for the maximum number of luminance bins in the first set $\Theta_H$, subject to the number-of-segment constraint. Available codeword range expansion may be performed to increase available codewords to these luminance bins. In the procedure, the search can be started from having U luminance bins as a current candidate maximum number of luminance bins in the first set $\Theta_H$. With the current candidate maximum number of luminance bins in the first set $\Theta_H$, the number-of-segment constraint can be checked to see if the constraint is violated. In response to determining that the number-of-segment constraint is satisfied (or not violated), the current candidate maximum number of luminance bins can be determined as the maximum number of luminance bins in the first set $\Theta_H$. On the other hand, in response to determining that the number-of-segment constraint is violated (or not satisfied), the current candidate maximum number of luminance bins may be decrement by one. The luminance bin with the lowest priority setting in the first set $\Theta_H$ may be moved from the first set $\Theta_H$ to the fourth set $\Theta_C$. The foregoing steps may be repeated until the number-of-segment constraint is satisfied.

TABLE 3

```
// initialization
Obtain set Θ_H, Θ_L, Θ_Z, Θ_C
```

Calculate $U = \text{floor}\left(\frac{|\Theta_Z| + 0.5 \cdot |\Theta_L|}{(\beta - 1)}\right)$

```
// back search to find the maximum number of bin subject to piece count
converge_flag = 0;
while( converge_flag == 0){
   Θ_H = ḣ_0, ḣ_1, . . . , ḣ_{U-1}}         // an ordered set based on the priority settings
                                            // initially, set to the upper bound U
   Check num_piece                          // check the number-of-segment constraint
                                            // see TABLE 4 for segment number calculation
   If(num_piece <= 8){
      converge _flag = 1;                   // the maximum number is found
   }
   else{
      Θ_C = Θ_C ∪ ḣ_{U-1}                   // move the lowest priority setting from the
      U = U − 1;                            // ordered set to the fourth set Θ_C
   }
}
```

TABLE 4 below illustrates an example procedure to calculate a total number of segments that are needed by the plurality of luminance bins, which procedure can be used by the procedure in TABLE 3 above.

TABLE 4

```
num_piece = 1;
For i = 1 : 1 : M-1
   If type of bin i is different from bin ( i − 1 )
      num_piece ++;
   end
```

7. FORWARD RESHAPING

In some embodiments, after selecting the luminance bins for luminous range expansion in the first set $\Theta_H$ according to priority settings and the number-of-segment constraint, in block 210, the upstream device constructs the forward reshaping function based on the estimated bit depths $\hat{Q}_m^{16}$ derived from the minimal noise levels measured in a given image, a given group of pictures, a given scene, etc., in the input video signal. The constructed forward shaping function may be used to convert luminance/luma values in the input video signal to forward reshaped luminance/luma codewords in the output video signal.

For the purpose of illustration only, the input and output video signals are of the same overall bit depth $B_T$ (or $B_T = B_I$). A converting codeword (CC) unit may be determined for each input codeword unit (or 1) ranging from 0 to ($2^{B_T} - 1$), as shown in TABLE 5 below.

TABLE 5

```
for( i = 0; i < 2^{BT} − 1; i ++){
   switch( type of bin )
      case Θ_Z: CC_i = 0; break;
      case Θ_C: CC_i = 1; break;
      case Θ_L: CC_i = 0.5; break;
```

$\quad$ case $\Theta_H$: $CC_i = \frac{|\Theta_Z| + 0.5 \cdot |\Theta_L|}{(\beta - 1)}$; break;

```
}
```

As can be seen in TABLE 5, a CC unit (denoted as $CC_i$) for an input coding unit at the i-th input codeword (or input luminance/luma value) may be set based on the luminance bin type to which the i-th input codeword belongs. The CC unit for the input coding unit at the i-th input codeword represents, or is proportional to, a local slope (or a local difference) of the forward reshaping function at the i-th input codeword. It should be noted that the luminance bin type of luminance bins that are originally in the first set $\Theta_H$ but have moved to the fourth set $\Theta_C$ in the procedure of TABLE 3 is considered to be the same as the luminance bin type of the fourth set $\Theta_C$ in the procedure of TABLE 5.

CC units for input coding units at all input codewords ranging from 0 to ($2^{B_T} - 1$) may be used by an example procedure illustrated in TABLE 6 below to construct the forward reshaping function in the form of a LUT (denoted as FLUT), for example through the cumulative sum of CCi.

TABLE 6

```
// cumulative sum
FLUT[0] = CC_0 ;
for( i = 1 ; i < 2^{BT} − 1; i ++){
   FLUT[i] = FLUT[i-1] + CC_i;
}
// rounding
for( i = 0 ; i < 2^{BT} − 1; i ++){
   FLUT[i] = round( FLUT[i] );
}
```

Additionally, optionally or alternatively, filtering, smoothening, interpolation, and so forth, may be performed as a part of generating the forward reshaping function or constructing a final version (e.g., FLUT, etc.) of the forward reshaping function.

Examples of constructing a FLUT for forward reshaping using cumulative sums, filtering, smoothening, interpolation, and so forth, can be found in U.S. Provisional Application No. 62/312,450, filed on Mar. 23, 2016, entitled "ENCODING AND DECODING REVERSIBLE PRODUCTION-QUALITY SINGLE-LAYER VIDEO SIGNALS" by Guan-Ming Su, Scott Miller and Walter Husak, which is hereby incorporated by reference as if fully set forth herein.

In block 210 of FIG. 2, the upstream device performs forward reshaping on the input video signal to generate a forward reshaped video signal in a CAQ reshaped domain, as illustrated in FIG. 1A. The forward reshaped video signal $S_j(p)$ can be generated from the input video signal by forward reshaping the input video signal, as follows:

$$S_j(p) = FLUT[I_j(p)] \quad (19)$$

where p represents pixel(s) in the image, the group of pictures, the scene, etc., in the input video signal for which FLUT is constructed under the techniques as described herein; and $I_j$ represents the pixel/luminance value(s) (or input pixel/luminance codeword(s)) of the pixel(s).

8. SPATIAL FILTERING

Based on the foregoing, for pixels with luminance values in luminance bins remaining in the first set $\Theta_H$, the numbers of available codewords in these luminance bins can be increased to reduce the risk of banding artifacts. However, merely performing dynamic range expansion with these luminance bins does not increase the actual numbers of codewords used by pixels with luminance values falling within these luminance bins. This is because the dynamic range expansion may map a fixed set (or a fixed number) of input codeword in the input video signal to another fixed set (or another fixed number) of (e.g., distinct, used, etc.) output codewords (supported by the available codewords) in the reshaped video signal via the one-to-one forwarding reshaping function. Banding artifacts may not be removed, as the entropies inside these luminance bins may remain the same.

To effectively remove or reduce banding artifacts, the total number of actual (e.g., distinct, etc.) used codewords may need to be increased after the range expansion, as entropies in these luminance bins are changed, and as new codewords are created/inserted into the reshaped video signal to generate the output video signal (e.g., in the reshaped domain, etc.) with reduced or removed banding artifacts.

In block 212 of FIG. 2, the upstream device performs decontouring/debanding operations by applying a spatial filtering operation (e.g., 106 of FIG. 1A, etc.) to the forward reshaped video signal to increase the actual number of used codeword in the luminance bins and thus to exploit the increased bit depths allocated to the selected luminance bins. The spatial filtering operation (106) may be based on differences of smoothened images (DoS) techniques, examples of which can be found in U.S. Provisional Application No. 62/026,281, filed on Jul. 18, 2014, entitled "IMAGE DECONTOURING IN HIGH DYNAMIC RANGE VIDEO PROCESSING" by Guan-Ming Su, and Konstantinos Konstantinides, which is hereby incorporated by reference as if fully set forth herein.

In some embodiments, the spatial filtering operation (106) applies a smoothening operator to a forward reshaped image in the forward reshaped video signal to generate a smoothened image. Banding (false contouring) artifacts often happen in certain spatial regions (or flat areas) in the forward reshaped image, where there exist many stairs (quantization steps) in the forward reshaped codewords. To remove those banding artifact, replacement values generated by the smoothening filter (e.g., a 2D resampling filter, etc.) to fill in for missing real values that were lost in quantization. In some embodiments, these replacement values may be smoothened values interpolated by the smoothening filter from neighboring stairs.

Additionally, optionally or alternatively, the spatial filtering operation (106) may further apply a masking operator to the smoothened image to limit the effects of smoothening to the flat areas that are of relatively high risks of banding artifacts.

Thus, a spatially filtered image $D_j$ generated by applying the DoS techniques to the forward reshaped image $S_j$ may be derived as follows:

$$D_j = DoS(S_j) \quad (20)$$

An output image corresponding to the input image may be derived by fusing the forward reshaped image $S_j$ with the spatially filtered image $D_j$, pixel by pixel, according to whether a pixel belongs to the remaining luminance bins (e.g., the selected luminance bins, etc.) in the first set $\Theta_H$, as follows:

$$S_j(p) = (p \in \Theta_H)?D_j(p):S_j(p) \quad (21)$$

In some embodiments, a LUT (denoted as BLUT) to be used by a recipient device of the output video signal to perform backward reshaping on images decoded from the output video signal may be generated based at least in part on the forward reshaping function (or FLUT). For example, for each reshaped codeword in a reshaped image of the reshaped video signal generated from forward reshaping an input image of the input video signal, input codewords (in the input image) mapped to the same reshaped codeword value (in the reshaped image) may be grouped. Based on these input codewords and each such reshaped codeword, the backward reshaping function (or BLUT) can be constructed by determining/identifying mappings between a set of input codewords used in the input image and a set of reshaped codewords used in the reshaped image. Additionally, optionally or alternatively, one or both of the forward reshaping function (or FLUT) and the backward reshaping function (or BLUT) may be represented or approximated with a multi-segment function such as 8-segment polynomial pieces and so forth. Example reshaping function construction and/or reshaping function approximation based on multi-segment functions can be found in U.S. Provisional Application No. 62/136,402, filed on Mar. 20, 2015, entitled "SIGNAL RESHAPING APPROXIMATION" by Guan-Ming Su, and Konstantinos Konstantinides, which is hereby incorporated by reference as if fully set forth herein.

Image metadata (e.g., 118 of FIG. 1A) comprising operational parameters specifying reshaping function(s) as described herein such as the backward reshaping function and so forth may be generated and transmitted (in an image metadata container, a sub-stream, a component bitstream, etc., of a coded bitstream) to a recipient device along with the output video signal (in a separate image container, separate sub-stream, separate component bitstream, etc., of the coded bitstream).

Additionally, optionally or alternatively, image metadata (e.g., 118 of FIG. 1A) as described herein may comprise display management (DM) metadata for a recipient device to use in performing DM operations, inversely mapping metadata for a recipient device to use in performing inverse mapping operations, and so forth, in addition to or in place of operational parameters that specify a backward reshaping function.

Figure 3B:
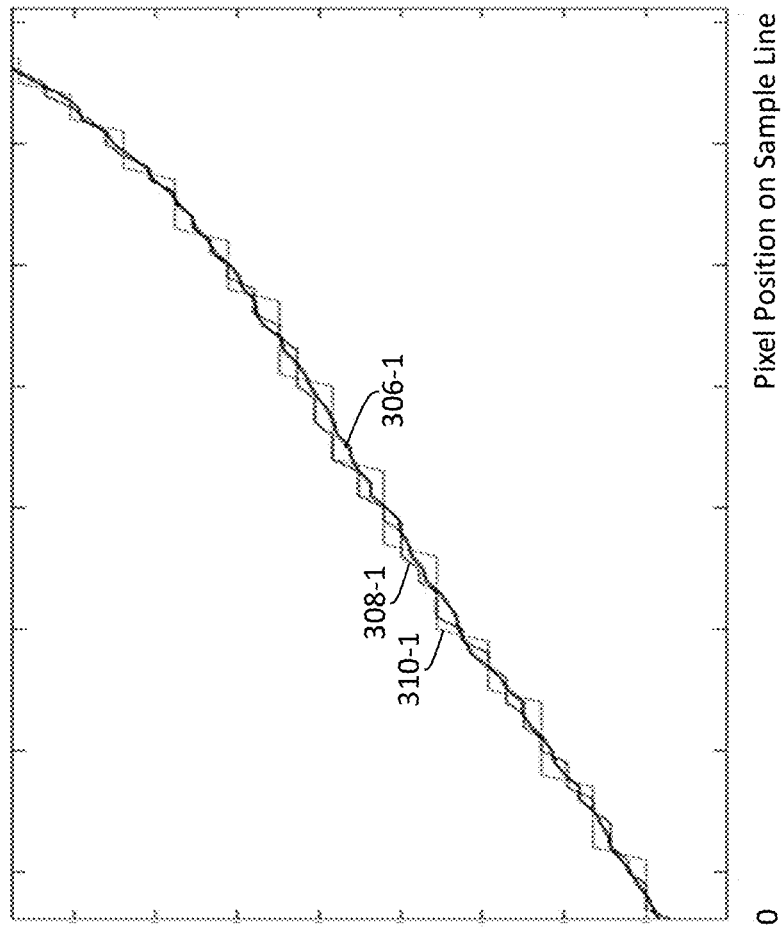
FIG. 3B and FIG. 3C illustrate example sample lines of reshaped images, reshaped and spatially filtered images, and high bit depth images.
Figure 3C:
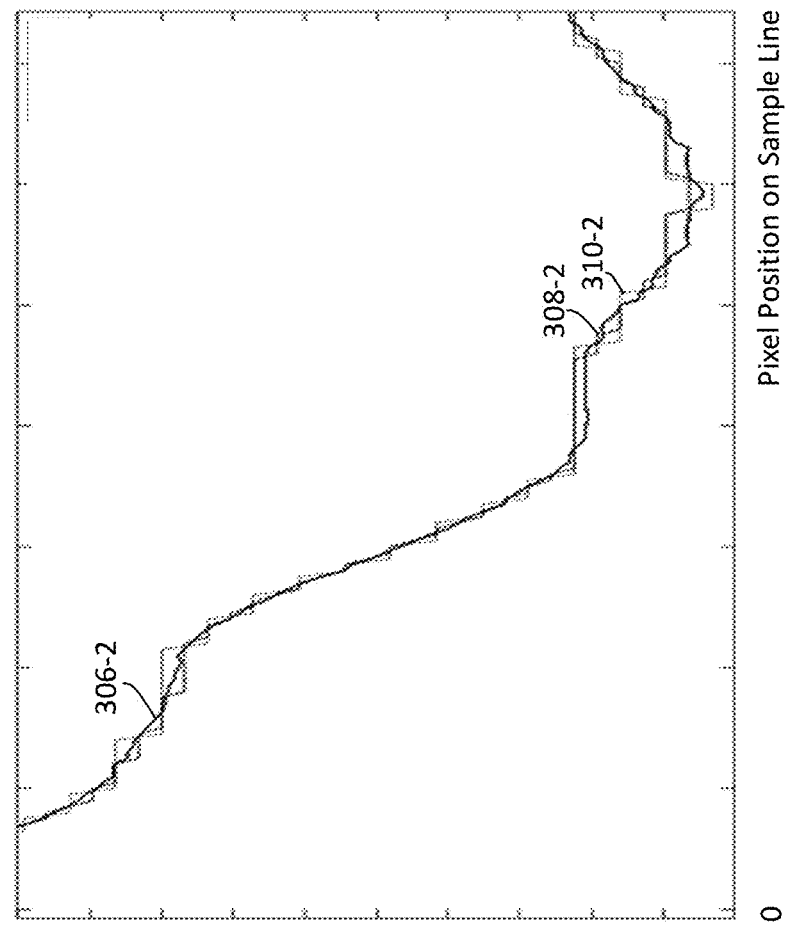

FIG. 3B and FIG. 3C illustrate example sample lines (e.g., rows, columns, etc.) of reshaped images (e.g., a 10-bit images, etc.), reshaped and spatially filtered images (e.g., 10-bit images, etc.) generated by forward reshaping and spatially filtering the input images, and corresponding relatively high bit depth images (e.g., a 16-bit images, etc.) having the same image content as the input images.

In FIG. 3B, a first sample line 306-1 is from a first relatively high bit depth image; a second sample line 308-1 is from a first reshaped and spatially filtered image; a third sample line 310-1 is from a first reshaped image. As shown in FIG. 3B, for each stair step in the third sample line 310-1, more stairs steps are inserted in the second sample line 308-1. This demonstrates that the bit depth of the first reshaped and spatially filtered image generated under techniques as described herein is increased relative to the bit depth of the first reshaped image.

Similarly, in FIG. 3C, a fourth sample line 306-2 is from a second relatively high bit depth image; a fifth sample line 308-2 is from a second reshaped and spatially filtered image; a sixth sample line 310-2 is from a second reshaped image. As shown in FIG. 3C, for each stair step in the sixth sample line 310-2, more stairs steps are inserted in the fifth sample line 308-2. This demonstrates that the bit depth of the second reshaped and spatially filtered image generated under techniques as described herein is increased relative to the bit depth of the second reshaped image.

9. EXAMPLE PROCESS FLOWS

FIG. 4A illustrates an example process flow according to an example embodiment of the present invention. In some example embodiments, one or more computing devices or components may perform this process flow. In block 402, an upstream device (e.g., forward reshaping 104, spatial filtering operation 106, encoding operation 108, etc., of FIG. 4A) determines, over a plurality of input codeword bins, a plurality of input minimal noise levels of an input bit depth based on image content in one or more input images of the input bit depth.

In block 404, the upstream device adjusts the plurality of minimal noise levels to generate a plurality of approximated minimal noise levels that approximate minimal noise levels of a higher bit depth than the input bit depth.

In block 406, the upstream device uses the plurality of approximated minimal noise levels to generate a plurality of per-bin bit depths over the plurality of input codeword bins.

In block 408, the upstream device classifies, based on the plurality of per-bin bit depths generated from the plurality of approximated minimal noise levels, the plurality of input codeword bins into a plurality of sets of codeword bins, the plurality of sets of codeword bins comprising a first set of input codeword bins that have relatively high risks of banding artifacts, and one or more sets of input codeword bins that have relatively low or zero risks of banding artifacts.

In block 410, the upstream device moves portions of bit depths from the one or more sets of input codeword bins to the first set of input codeword bins to generate a plurality of modified per-bin bit depths from the plurality of per-bin bit depths.

In block 412, the upstream device reshapes the one or more input images into one or more reshaped images based on a forward reshaping function constructed from the plurality of modified per-bin bit depths.

In block 414, the upstream device spatially filters the one or more reshaped images to generate one or more spatially filtered images.

In block 416, the upstream device combines the one or more spatially filtered images and the one or more reshaped images into one or more output images that are to be encoded and transmitted in an output video signal of an output bit depth to one or more recipient devices for rendering.

In an embodiment, the one or more spatially filtered images are generated by applying one or both of a smoothening operation or a residual masking operation.

In an embodiment, the one or more input images are from an input video signal of the input bit depth.

In an embodiment, the input bit depth is no more than the output bit depth.

In an embodiment, the plurality of approximated minimal noise levels is generated by adjusting the plurality of minimal noise levels with a bit depth offset term proportional to a scaling factor.

In an embodiment, the plurality of input codeword bins represents a plurality of luma codeword bins that are non-overlapping and that collectively and contiguously cover all available luma codewords in a luma codeword space of the input bit depth.

In an embodiment, the one or more sets of input codeword bins that have relatively low or zero risks of banding artifacts comprise input codeword bins in which input codewords are less than a minimum codeword used in the one or more input images or more than a maximum codeword used in the one or more input images.

In an embodiment, the one or more sets of input codeword bins that have relatively low or zero risks of banding artifacts comprise input codeword bins over each of which a corresponding bit depth in the plurality of bit depths, as scaled by a total number of input codeword bins in the plurality of input codeword bins, is below a threshold bit depth less than a target bit depth equal to the output bit depth of the output video signal.

In an embodiment, the first set of input codeword bins that have relatively high risks of banding artifacts comprise input codeword bins over each of which a corresponding bit depth in the plurality of bit depths, as scaled by a total number of input codeword bins in the plurality of input codeword bins, is more than a target bit depth equal to the output bit depth of the output video signal.

In an embodiment, the upstream device is further configured to perform: prioritizing the first set of input codeword bins with priority settings; computing, based at least in part on a set magnitude of the first set of input codeword bins and one or more set magnitudes of the one or more sets of input codeword bins, a ceiling number of input codeword bins for receiving extra bit depths extracted out of the one or more sets of input luminance bins; selecting up to the ceiling number of input codeword bins with relatively high priority settings from the first set of input codeword bins to receive the extra bit depths.

In an embodiment, the upstream device is further configured to perform: constructing a backward reshaping function to be used by a recipient device to perform backward reshaping on decoded images decoded from the output video signal; generating image metadata with operational parameters for the recipient device to construct the backward reshaping function; providing, to the recipient device, the image metadata with the one or more output images in the output video signal.

In an embodiment, the upstream device is further configured to perform: generating image metadata with inverse mapping metadata for the recipient device to use the inverse mapping metadata to perform inverse mapping operations; providing, to the recipient device, the image metadata with the one or more output images in the output video signal.

In an embodiment, the one or more input images are decoded from an input video signal that represents a 10-bit high dynamic range (HDR) signal, and wherein the output video signal represents a 10-bit content adaptive perceptual quantized (CAQ) signal.

In an embodiment, the plurality of input minimal noise levels of an input bit depth based on image content in one or more input images of the input bit depth is computed based on one of: high spatial frequency components in the image content in the one or more input images, complexity metrics of a plurality of pixel blocks in the one or more input images, etc.

In an embodiment, the one or more input images are converted from one or more images decoded from a hybrid log gamma (HLG) video signal.

Figure 4B:
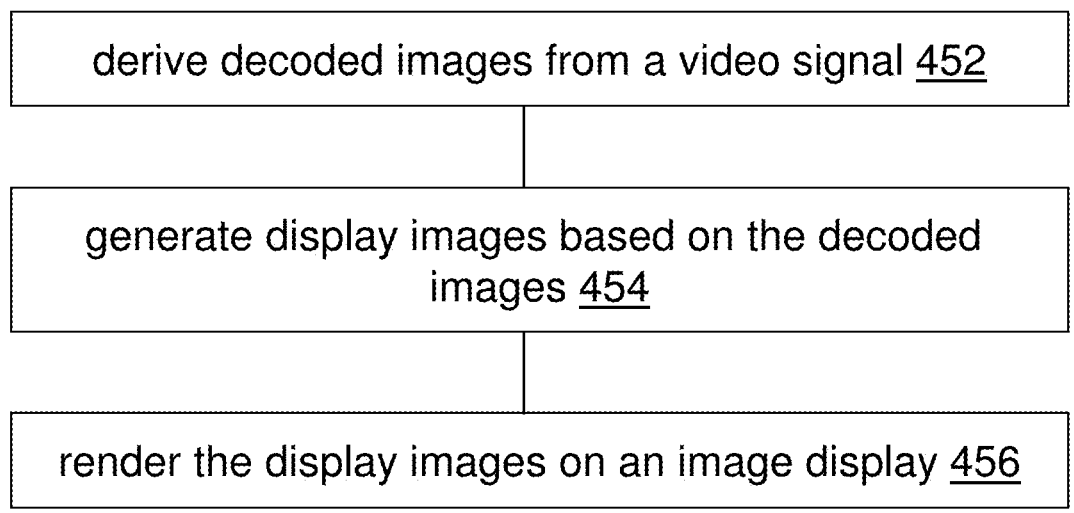

FIG. 4B illustrates an example process flow according to an example embodiment of the present invention. In some example embodiments, one or more computing devices or components may perform this process flow. In block 452, a recipient device (e.g., decoding operation 112, backward reshaping operation 114, etc., of FIG. 4B) derives one or more decoded images from a video signal of a signal bit depth, the decoded images being generated based at least in part on one or more reshaped images.

The one or more reshaped images are generated from reshaping one or more images of a specific bit depth based on a forward reshaping function constructed from a plurality of modified per-bin bit depths. The plurality of modified per-bin bit depths from the plurality of per-bin bit depths is generated by moving portions of bit depths from one or more sets of codeword bins that have relatively low or zero risks of banding artifacts to a first set of codeword bins that have relatively high risks of banding artifacts. The first set of luminance bins and the one or more sets of luminance bins are classified, based on a plurality of per-bin bit depths over a plurality of codeword bins, from the plurality of codeword bins. The plurality of per-bin bit depths over the plurality of codeword bins is generated using a plurality of approximated minimal noise levels that approximate minimal noise levels of a higher bit depth than the specific bit depth of the one or more images. The plurality of approximated minimal noise levels is generated by adjusting a plurality of minimal noise levels of the specific bit depth. The plurality of minimal noise levels of the specific bit depth is computed based on image content in the one or more images of the specific bit depth.

In block 454, the recipient device generates one or more display images based at least in part on the one or more decoded images.

In block 456, the recipient device renders the one or more display images on an image display.

In an embodiment, the one or more decoded images represent one or more reshaped and spatially filtered images generated from combining the one or more reshaped images and one or more spatially filtered images generated by spatially filtering the one or more images of the specific bit depth, subject to coding errors.

In an embodiment, the specific bit depth of the one or more images is no more than the signal bit depth of the video signal.

In an embodiment, the recipient device is further configured to perform: extracting image metadata from the video signal; using operational parameters in the image metadata to construct a backward reshaping function; using the backward reshaping function to perform backward reshaping on the one or more decoded images decoded from the video signal as a part of generating the one or more display images.

In an embodiment, the recipient device is further configured to perform: extracting image metadata from the video signal; using inverse mapping metadata in the image metadata to perform inverse mapping on the one or more decoded images decoded from the video signal to generate one or more inversely mapped images.

In an embodiment, the one or more inversely mapped images are of a higher bit depth than the signal bit depth of the video signal.

In various example embodiments, an encoder, a decoder, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

10. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
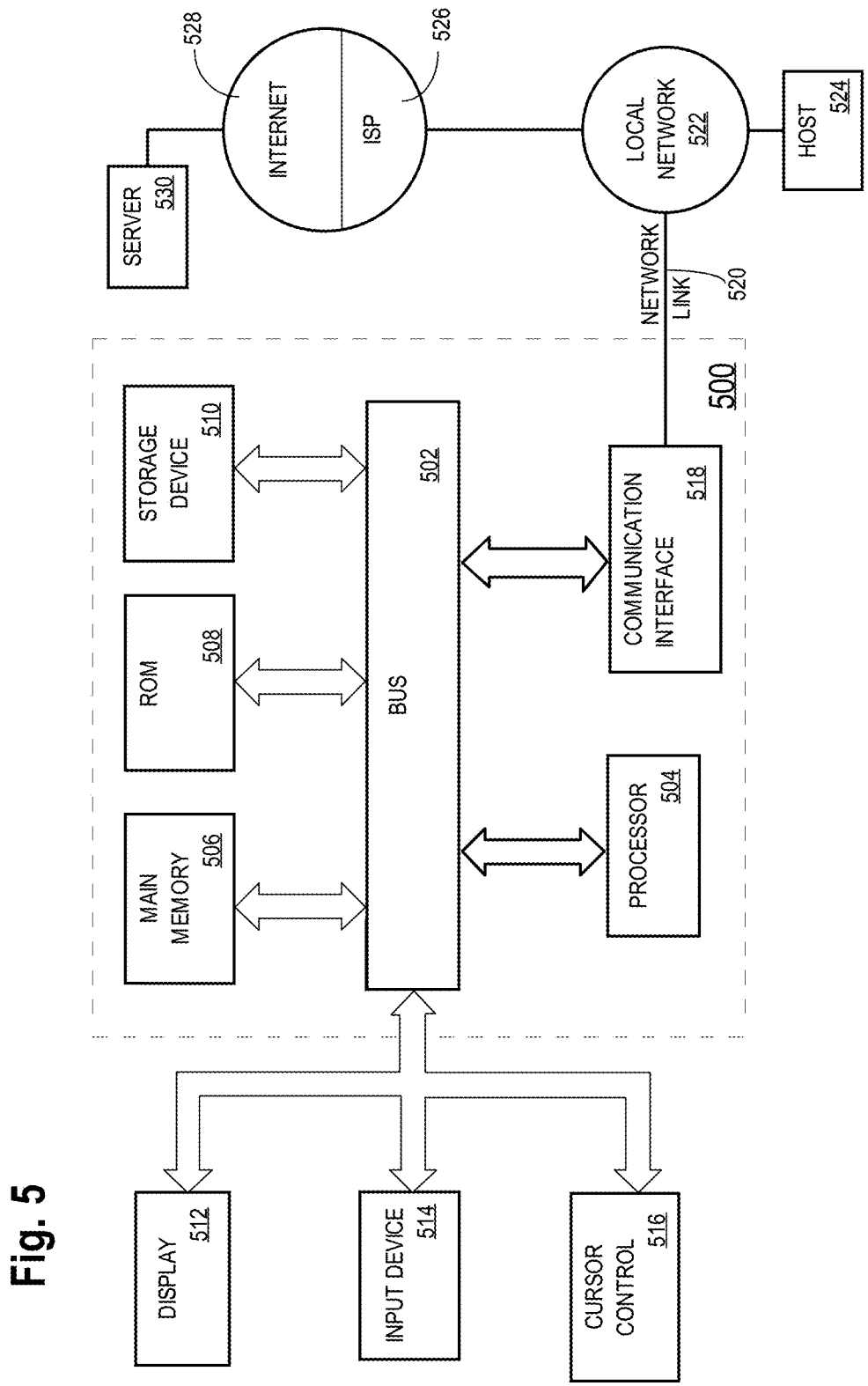
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   determining, over a plurality of input codeword bins, a plurality of input minimal noise levels of an input bit depth based on image content in one or more input images of the input bit depth;
   adjusting the plurality of minimal noise levels to generate a plurality of approximated minimal noise levels that approximate minimal noise levels of a higher bit depth than the input bit depth;
   using the plurality of approximated minimal noise levels to generate a plurality of per-bin bit depths over the plurality of input codeword bins;
   classifying, based on the plurality of per-bin bit depths generated from the plurality of approximated minimal noise levels, the plurality of input codeword bins into a plurality of sets of codeword bins, the plurality of sets of codeword bins comprising a first set of input codeword bins that have relatively high risks of banding artifacts, and one or more sets of input codeword bins that have relatively low or zero risks of banding artifacts;

moving portions of bit depths from the one or more sets of input codeword bins to the first set of input codeword bins to generate a plurality of modified per-bin bit depths from the plurality of per-bin bit depths;

reshaping the one or more input images into one or more reshaped images based on a forward reshaping function constructed from the plurality of modified per-bin bit depths;

spatially filtering the one or more reshaped images to generate one or more spatially filtered images;

combining the one or more spatially filtered images and the one or more reshaped images into one or more output images that are to be encoded and transmitted in an output video signal of an output bit depth to one or more recipient devices for rendering.

2. The method as recited in claim 1, wherein the one or more spatially filtered images are generated by applying one or both of a smoothening operation or a residual masking operation.

3. The method as recited in claim 1, wherein the one or more input images are from an input video signal of the input bit depth.

4. The method as recited in claim 1, wherein the input bit depth is no more than the output bit depth.

5. The method as recited in claim 1, wherein the plurality of approximated minimal noise levels is generated by adjusting the plurality of minimal noise levels with a bit depth offset term proportional to a scaling factor.

6. The method as recited in claim 1, wherein the plurality of input codeword bins represents a plurality of luma codeword bins that are non-overlapping and that collectively and contiguously cover all available luma codewords in a luma codeword space of the input bit depth.

7. The method as recited in claim 1, wherein the one or more sets of input codeword bins that have relatively low or zero risks of banding artifacts comprise input codeword bins in which input codewords are less than a minimum codeword used in the one or more input images or more than a maximum codeword used in the one or more input images.

8. The method as recited in claim 1, wherein the one or more sets of input codeword bins that have relatively low or zero risks of banding artifacts comprise input codeword bins over each of which a corresponding bit depth in the plurality of bit depths, as scaled by a total number of input codeword bins in the plurality of input codeword bins, is below a threshold bit depth less than a target bit depth equal to the output bit depth of the output video signal.

9. The method as recited in claim 1, wherein the first set of input codeword bins that have relatively high risks of banding artifacts comprise input codeword bins over each of which a corresponding bit depth in the plurality of bit depths, as scaled by a total number of input codeword bins in the plurality of input codeword bins, is more than a target bit depth equal to the output bit depth of the output video signal.

10. The method as recited in claim 1, further comprising:
prioritizing the first set of input codeword bins with priority settings;
computing, based at least in part on a set magnitude of the first set of input codeword bins and one or more set magnitudes of the one or more sets of input codeword bins, a ceiling number of input codeword bins for receiving extra bit depths extracted out of the one or more sets of input luminance bins;
selecting up to the ceiling number of input codeword bins with relatively high priority settings from the first set of input codeword bins to receive the extra bit depths.

11. The method as recited in claim 1, further comprising:
constructing a backward reshaping function to be used by a recipient device to perform backward reshaping on decoded images decoded from the output video signal;
generating image metadata with operational parameters for the recipient device to construct the backward reshaping function;
providing, to the recipient device, the image metadata with the one or more output images in the output video signal.

12. The method as recited in claim 1, further comprising:
generating image metadata with inverse mapping metadata for the recipient device to use the inverse mapping metadata to perform inverse mapping operations;
providing, to the recipient device, the image metadata with the one or more output images in the output video signal.

13. The method as recited in claim 1, wherein the one or more input images are decoded from an input video signal that represents a 10-bit high dynamic range (HDR) signal, and wherein the output video signal represents a 10-bit content adaptive perceptual quantized (CAQ) signal.

14. The method as recited in claim 1, the plurality of input minimal noise levels of an input bit depth based on image content in one or more input images of the input bit depth is computed based on one of: high spatial frequency components in the image content in the one or more input images, or complexity metrics of a plurality of pixel blocks in the one or more input images.

15. The method as recited in claim 1, the one or more input images are converted from one or more images decoded from a hybrid log gamma (HLG) video signal.

16. A method, comprising:
deriving one or more decoded images from a video signal of a signal bit depth, the decoded images being generated by combining one or more spatially filtered images and one or more reshaped images;
the one or more spatially filtered images being generated by spatially filtering the one or more reshaped images;
the one or more reshaped images being generated from reshaping one or more images of a specific bit depth based on a forward reshaping function constructed from a plurality of modified per-bin bit depths;
the plurality of modified per-bin bit depths from the plurality of per-bin bit depths being generated by moving portions of bit depths from one or more sets of codeword bins that have relatively low or zero risks of banding artifacts to a first set of codeword bins that have relatively high risks of banding artifacts;
the first set of luminance bins and the one or more sets of luminance bins being classified, based on a plurality of per-bin bit depths over a plurality of codeword bins, from the plurality of codeword bins;
the plurality of per-bin bit depths over the plurality of codeword bins being generated using a plurality of approximated minimal noise levels that approximate minimal noise levels of a higher bit depth than the specific bit depth of the one or more images;

the plurality of approximated minimal noise levels being generated by adjusting a plurality of minimal noise levels of the specific bit depth;

the plurality of minimal noise levels of the specific bit depth being computed based on image content in the one or more images of the specific bit depth;

generating one or more display images based at least in part on the one or more decoded images;

rendering the one or more display images on an image display.

17. The method as recited in claim 16, wherein the one or more decoded images represent one or more reshaped and spatially filtered images generated from combining the one or more reshaped images and one or more spatially filtered images generated by spatially filtering the one or more images of the specific bit depth, subject to coding errors.

18. The method as recited in claim 16, wherein the specific bit depth of the one or more images is no more than the signal bit depth of the video signal.

19. The method as recited in claim 16, further comprising:
extracting image metadata from the video signal;
using operational parameters in the image metadata to construct a backward reshaping function;
using the backward reshaping function to perform backward reshaping on the one or more decoded images decoded from the video signal as a part of generating the one or more display images.

20. The method as recited in claim 16, further comprising:
extracting image metadata from the video signal;
using inverse mapping metadata in the image metadata to perform inverse mapping on the one or more decoded images decoded from the video signal to generate one or more inversely mapped images.

21. The method as recited in claim 20, wherein the one or more inversely mapped images are of a higher bit depth than the signal bit depth of the video signal.

22. A computer system configured to perform the method recited in claim 1.

23. An apparatus comprising a processor and configured to perform the method recited in claim 1.

24. A non-transitory computer-readable storage medium having stored thereon computer-executable instruction for executing a method in accordance with claim 1.

* * * * *